March 31, 1959  R. C. CUSSONS  2,879,987
LIQUID SPRINGS
Filed June 4, 1957
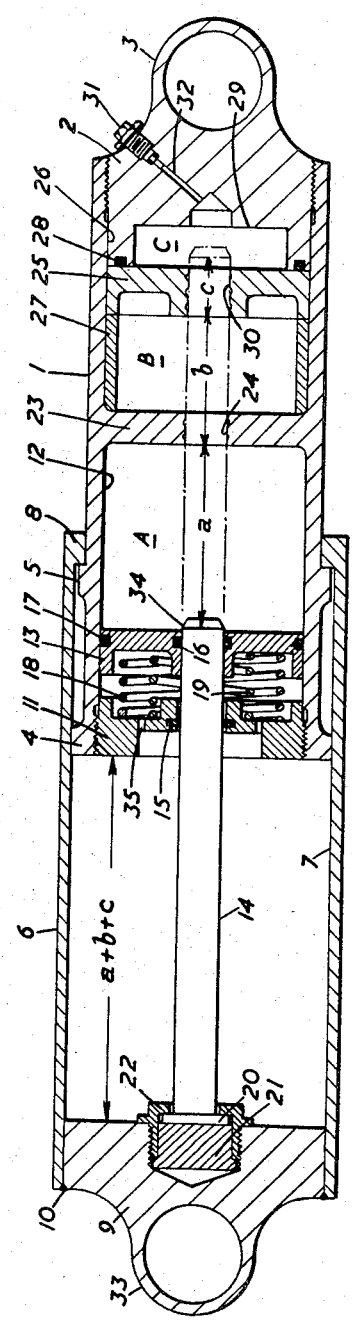
INVENTOR
Richard C. Cussons
BY
Reynolds Beach &
Christensen
ATTORNEYS United States Patent Office 2,879,987
Patented Mar. 31, 1959

2,879,987
LIQUID SPRINGS

Richard C. Cussons, Cheltenham, England, assignor to Dowty Equipment Limited, Cheltenham, England Application June 4, 1957, Serial No. 663,462

Claims priority, application Great Britain June 8, 1956

6 Claims. (Cl. 267—64)

This invention relates to liquid spring shock absorbers and its object is to provide a construction giving one or more stages of resistance to compression and including an initial stage wherein there is either a small resistance to compression or substantially no appreciable resistance at all.

A liquid spring in accordance with the invention is illustrated in the accompanying drawing which is a sectional view on a longitudinal central plane. A pressure cylinder 1 receives at one end a screw-threaded plug 2 which is provided with an attachment lug 3 for connection to an external body. At its other end, the pressure cylinder 1 has an external flange 4, the outer surface of which forms a slide bearing, while a further flange 5 on the intermediate part of the cylinder 1 provides an abutment stop.

A sleeve 6 slidable on the cylinder 1 has a bore 7 engaging with the bearing surface of the flange 4, and a flange 8 which is in slidable contact with the outer surface of the cylinder 1. The internal flange 8 on the sleeve 6 will engage the intermediate flange 5 on the cylinder 1 to limit relative extension of the cylinder 1 and sleeve 6. The outer end of the sleeve 6 receives a head-piece 9 secured thereto, for example, as shown by a weld 10 at adjoining edges. The inner end of the pressure cylinder 1 receives a fixed screw-threaded gland ring 11 and, within the bore 12 of the cylinder, a movable ring 13. Both gland rings 11 and 13 are centrally apertured to receive a plunger 14 which is sealed to the gland rings 11 and 13 by packing rings 15 and 16 respectively. A packing ring 17 recessed into the outer surface of the movable gland ring 13 engages the bore 12 of the cylinder. Compression springs 18 and 19 are interposed between the gland rings 11 and 13.

The plunger 14 has a flanged head 20 which is held captively between an end bearing pad 21 and a screw-threaded retaining ring 22 which is secured in the head-piece 9. The flanged head 20 has lateral clearance within the retaining ring 22 thus providing a relatively slidable transverse joint between the head-piece 9 and the head of the plunger whereby the latter is free to maintain alignment with the axis of the cylinder.

In the fully extended state of the liquid spring as shown in the drawing, the inner end of the plunger projects slightly beyond the movable gland ring 13 into the first chamber A of the liquid spring. The inner terminal wall of the chamber A is provided by a first partition 23 which is integral with the cylinder 1 and has a central bore 24 of a size to provide a good sliding fit with the plunger 14.

Beyond the chamber A, a second chamber B is provided which is enclosed endwise by the first partition 23 and a second partition 25. This second partition is in the form of a disc fitting the counterbore 26 of the cylinder and spaced from the first partition 23 by a spacer ring 27, the disc 25 and spacer ring 27 being together clamped firmly against the first partition 23 by screwing up the plug 2 during assembly. The inner end of the plug receives a packing ring 28 which is compressed against the disc 25 to provide a seal, while a recess 29 in the plug provides a third chamber C between the disc 25 and the plug 2. The disc 25 has a central bore 30 capable of providing a good sliding fit with the plunger 14.

A charging valve 31 fitted into the plug 2 connects through a drilled hole 32 with the chamber C and thus with the chambers B and A when the plunger 14 is fully extended.

The head-piece 9 has an attachment lug 33 for connection with an external body. When the liquid spring is compressed by movement together of the two external bodies connected at 3 and 33 respectively, the inner end of the plunger 14, which is provided with a tapered lead 34, traverses the chamber A through the distance $a$ before engaging the bore 24 of the first partion 23. During this traversing movement the liquid displaced by the plunger 14 causes the movable gland ring 13 to yield against the load of the springs 18 and 19, and the space between the two gland rings 11 and 13 breathes through a vent 35 in the fixed gland ring 11 which is open to atmosphere. Hence, the resistance during the travel $a$ is determined by the area of the pluger 14, the area of the movable gland ring 13, and the rate of the springs 18 and 19.

When the plunger 14 engages the bore 24 of the first partition 23, then the chamber A is closed from the chambers B and C, whereupon further displacement of the plunger 14 through the distance $b$ up to the position where the plunger 14 enters the bore 30 of the second partition 25, will be resisted by compression of liquid wholly filling the chambers B and C. On account of the good sliding fit of the plunger in the bore 24, any leakage of liquid from the chambers B and C into the chamber A will be inappreciable for a compression stroke of short duration. Thus, the resistance to the compressive stroke of the plunger 14 over the distance $b$ during which liquid is compressed, will be many times greater than the resistance over the displacement $a$ during which the springs 18 and 19 are compressed.

When the tapered lead 34 of the plunger 14 enters the bore 30 of the second partition 25 the chamber C is isolated from the chamber B and no further liquid compression will take place in the latter, while the resistance to compression of the plunger 14 will be provided by compression of the liquid in the chamber C alone. Since the volume of the chamber C is less than the combined volumes of the chambers B and C, the ratio of load to stroke will rise during the terminal displacement $c$.

Thus, on a load/stroke curve for the liquid spring, the first stage of compression will show a small or negligible increase in load, and the second stage will show a substantial increase in reaction load with plunger travel, while the third stage will show a considerably greater rate of increase of load with plunger travel. The chamber volumes may be selected to give the required travel and load characteristics.

Since the only liquid-tight seal between the pressure cylinder and the plunger is on the gland ring and subject only to low pressure, then the frictional resistance to plunger travel will be very small in relation to the applied load and the length of life and reliability of the seal correspondingly increased. The cylinder is devoid of any communication with the exterior, other than the charging hole 32 which is always closed, during operation, by the charging valve 31. Furthermore, although it is convenient to refer to the element 1 as a cylinder, it is not necessarily of cylindrical shape, since it is the entry of the plunger 14 into the spaces A, B, and C, or at least into the variable-volume space A and another space of fixed volume, past the closely surrounding bore 24 in the partition between chambers, that produces the different stages of resistance, regardless of the precise shape of such spaces.

I claim as my invention:

1. A liquid spring comprising a completely closed, wholly liquid-filled pressure cylinder, partition means therein defining at least two axially spaced chambers within said pressure cylinder, a plunger having its inner end entered within a first chamber only, and mounted slidably on the axis of the cylinder and of a length such that its inner end will traverse the chambers successively as the plunger is depressed, the first chamber to be traversed by the plunger including means yieldable under the influence of liquid displaced by the plunger to increase the first chamber's volume, and a second chamber of fixed volume separated from the first chamber by said partition means, and the partition means having a bore in which the plunger is engageable with a close sliding fit, after traversing the first chamber, so that continued movement of the plunger across the second chamber at least is resisted by the compression of liquid therein.

2. A liquid spring comprising a liquid-filled pressure cylinder closed at its outer end, a fixed gland ring secured at its inner end, a movable gland ring mounted to slide sealingly in the pressure cylinder adjacent the fixed gland ring, a spring interposed between said fixed and movable gland rings, a transverse partition within the pressure cylinder axially separated from the movable gland ring to form therebetween a first chamber of variable volume, a second chamber of fixed volume disposed between the transverse partition and the closed outer end of the pressure cylinder, central openings in the fixed gland ring, the movable gland ring and the transverse partition, and a plunger mounted to extend sealingly through said first and second gland rings, said plunger being arranged, when compressively loaded, firstly to traverse the chamber of variable volume, secondly to enter and close the central opening in the partition, and thereafter to compress the liquid filling the second chamber.

3. A liquid spring as in claim 2, comprising also a third chamber of fixed volume axially separated from the second chamber on the side thereof remote from the first chamber, a second partition within the pressure cylinder dividing the third chamber from the second, and a central opening in the second partition adapted to receive the plunger slidably therein.

4. A liquid spring comprising a liquid-filled pressure cylinder closed at its outer end, said cylinder being closed by a plug having attachment means for connection with an external body, a sleeve mounted telescopically on the pressure cylinder, co-operative stop means formed on the cylinder and sleeve to limit their telescopic extension, a head-piece fixed with respect to the outer end of the sleeve and having attachment means for connection with another external body, a fixed gland ring secured at the inner end of the pressure cylinder, a movable gland ring mounted to slide sealingly in the pressure cylinder adjacent the fixed gland ring, a spring interposed between the fixed and movable gland rings, a transverse partition within the pressure cylinder axially separated from the movable gland ring to form therebetween a first chamber of variable volume, a second chamber of fixed volume disposed between the transverse partition and the closed outer end of the pressure cylinder, central openings in the fixed gland ring, the movable gland ring and the transverse partition, and a plunger secured at one end to the head-piece and extending at its other end portion sealingly through said first and second gland rings, said plunger being arranged, when compressively loaded, firstly to traverse the chamber of variable volume, secondly to enter and close the central opening in the partition, and thereafter to compress the liquid filling the second chamber.

5. A liquid spring as in claim 4, wherein the plunger is secured to the head-piece by means comprising a flanged head on the plunger, a bearing surface in the head-piece engaging the flanged head on transverse mating faces, and a retaining ring engaging the flanged head and secured to the head-piece, said retaining ring having radial clearance around the flanged head permitting the plunger to take up a position of axial alignment with the pressure cylinder.

6. A liquid spring comprising a liquid-filled pressure cylinder devoid of communication with the exterior, at least one partition dividing the pressure cylinder into a plurality of axially spaced chambers, a plunger mounted and guided for sliding axially of the pressure cylinder, and of a length such that its inner end will traverse the chambers successively as the plunger is moved inwardly, and the partition having an aperture wherein the plunger is engageable with a close sliding fit after it has traversed the first chamber, means exposed to pressure within said first chamber, and resiliently yieldable under the influence of liquid displaced by the plunger upon its inward movement to increase the first chamber's volume, and the second chamber being of fixed volume, so that continued depression of the plunger into the second chamber at least is resisted by the compression of liquid therein.

References Cited in the file of this patent

UNITED STATES PATENTS

| | | |
|---|---|---|
| 1,198,643 | Liebau | Sept. 19, 1916 |
| 2,638,339 | Taylor | May 12, 1953 |
| 2,724,590 | Irwin | Nov. 22, 1955 |
| 2,773,517 | Hooper et al. | Dec. 11, 1956 |